(12) United States Patent
Chirol

(10) Patent No.: US 11,312,584 B2
(45) Date of Patent: Apr. 26, 2022

(54) METHOD OF PALLETIZING NON-UNIFORM ARTICLES

(71) Applicant: SOLYSTIC, Bagneux (FR)

(72) Inventor: Luc Chirol, Paris (FR)

(73) Assignee: SOLYSTIC, Bagneux (FR)

( * ) Notice: Subject to any disclaimer, the term of this patent is extended or adjusted under 35 U.S.C. 154(b) by 553 days.

(21) Appl. No.: 16/339,187

(22) PCT Filed: Dec. 11, 2018

(86) PCT No.: PCT/FR2018/053208
§ 371 (c)(1),
(2) Date: Apr. 3, 2019

(87) PCT Pub. No.: WO2019/122598
PCT Pub. Date: Jun. 27, 2019

(65) Prior Publication Data
US 2021/0371201 A1    Dec. 2, 2021

(30) Foreign Application Priority Data

Dec. 21, 2017  (FR) ..................................... 1762695

(51) Int. Cl.
*B65G 57/22*  (2006.01)
*B65G 1/137*  (2006.01)
*B65G 61/00*  (2006.01)
*G05B 19/418* (2006.01)
*B65G 43/08*  (2006.01)
*B65G 57/24*  (2006.01)
*G06Q 10/08*  (2012.01)

(52) U.S. Cl.
CPC ........... *B65G 57/22* (2013.01); *B65G 1/1371* (2013.01); *B65G 1/1378* (2013.01); *B65G 43/08* (2013.01); *B65G 57/24* (2013.01); *B65G 61/00* (2013.01); *G05B 19/4183* (2013.01); *G05B 19/4189* (2013.01); *G05B 19/41895* (2013.01); *G06Q 10/08* (2013.01); *B65G 2203/0216* (2013.01)

(58) Field of Classification Search
CPC .............................. B65G 1/1378; B65G 57/22
See application file for complete search history.

(56) References Cited

U.S. PATENT DOCUMENTS 4,692,876 A * 9/1987 Tenma ................. B65G 1/1371
                                                    414/791.6
5,501,571 A * 3/1996 Van Durrett ....... G05B 19/4189
                                                    414/801

(Continued)

FOREIGN PATENT DOCUMENTS

FR       3 039 780 A1    2/2017

*Primary Examiner* — Thomas Randazzo
(74) *Attorney, Agent, or Firm* — Ware, Fressola, Maguire & Barber LLP

(57) ABSTRACT

A method of palletizing non-uniform objects comprises using shuttle robots controlled by a monitoring and control system (190) to control trolleys, each of which carries an object, from a feed point (101) to a palletizing station (140) via a device (120) for determining the morphologies of the objects so as to characterize the outside shapes of all of the objects forming a batch before the start of the operation of stowing the objects on the pallet, so as to calculate a stowage plan that optimizes stowage of the batch on a pallet (150).

7 Claims, 2 Drawing Sheets

(56) References Cited

U.S. PATENT DOCUMENTS

| | | | |
|---|---|---|---|
| 2008/0167884 A1* | 7/2008 | Mountz | G06Q 10/0875 |
| | | | 705/29 |
| 2010/0178149 A1* | 7/2010 | Fritzsche | B65G 61/00 |
| | | | 414/789.5 |
| 2014/0135976 A1* | 5/2014 | Gue | B65G 1/1378 |
| | | | 700/214 |
| 2016/0296977 A1* | 10/2016 | Miette | G06Q 10/087 |
| 2017/0129705 A1* | 5/2017 | Luc | B07C 3/02 |
| 2017/0267467 A1* | 9/2017 | Kimoto | B25J 9/1687 |
| 2020/0039765 A1* | 2/2020 | Pankratov | B65G 57/09 |

\* cited by examiner

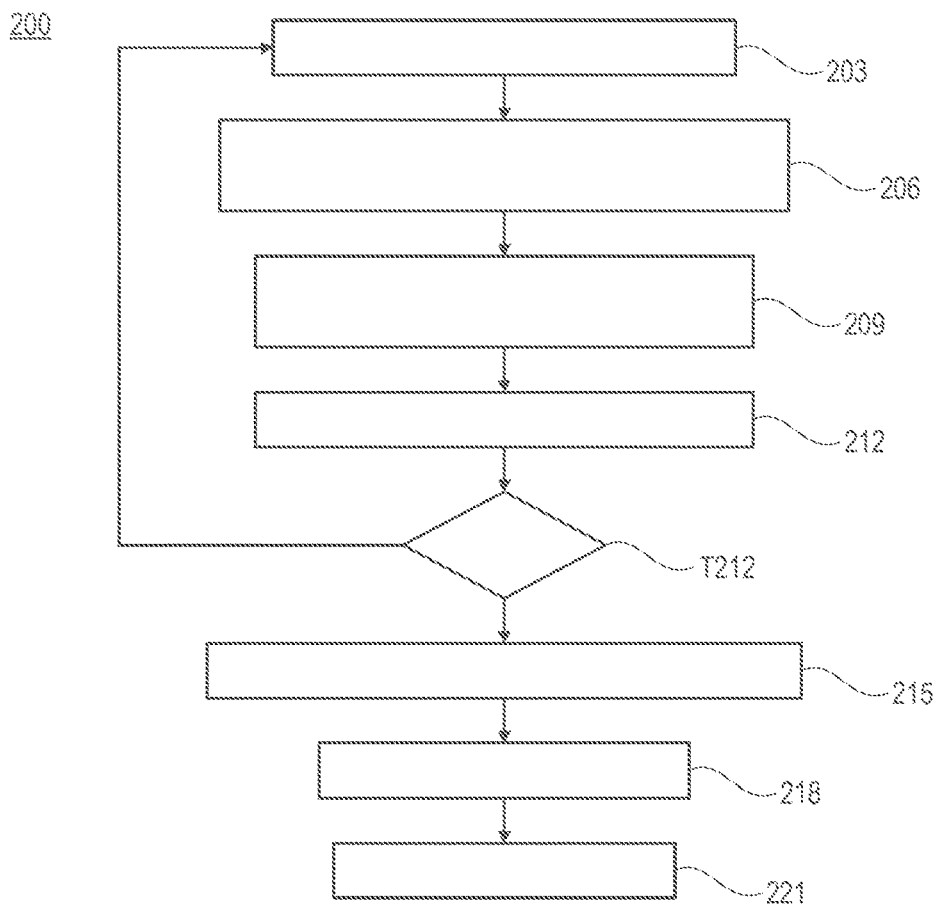
Fig. 2A
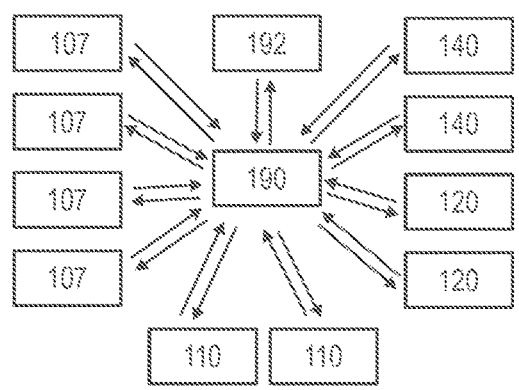
Fig. 2B
Fig. 2C

METHOD OF PALLETIZING NON-UNIFORM ARTICLES

CROSS REFERENCE TO RELATED APPLICATIONS

This application is the U.S. National Stage of International Application Number PCT/FR2018/053208 filed on Dec. 11, 2018, which application claims priority under 35 USC § 119 to French Patent Application No. 1762695 filed on Dec. 21, 2017. Both applications are hereby incorporated by reference in their entirety.

TECHNICAL FIELD

The invention relates to the field of logistics, and more precisely to the field of palletizing objects at logistics platforms, such objects being, in particular parcels that are in transit.

PRIOR ART

For handling purposes, objects to be transported are often stowed on pallets at sorting and palletizing logistics platforms.

Palletizing, i.e. stowing objects on pallets, is an operation that is still largely manual, which has a negative impact on the productivity and flexibility of operations, and which represents arduous work for human operatives.

More precisely, the operatives stow the objects by hand and in batches on the pallets as the objects arrive, requiring the operatives firstly to learn the rules of how batches should be formed, and secondly to rearrange batches on pallets as a function of the last objects to arrive.

These operations are all the more complex when the objects are non-uniform and are of shapes and weights that differ from one object to another, and when they are unknown when the objects arrive at the sorting and palletizing center.

In order to address some of those difficulties, U.S. Pat. No. 5,501,571 discloses a solution for automating palletizing. In that solution, the objects to be palletized are transported in succession on a conveyor, and they are identified and characterized by their dimensions and by their weights while they are passing along the conveyor, so as to improve the way in which they are stowed on a pallet situated at the end of the conveyor by means of a system that determines a configuration for optimizing the loading of the pallet for the last objects to arrive, and that stows each object as a function of its dimensions and of its weight.

Patent Application US 2008/0167884 discloses a method of preparing orders for articles that makes use of movable devices for storing articles and movable units for moving those devices.

SUMMARY OF THE INVENTION

The automation system described in U.S. Pat. No. 5,501,571 is based on an infrastructure that is fixed, that is not versatile, that is not adaptable, where one feed point corresponds to only one palletizing station, and that does not make it possible to achieve a high level of optimization of stowage on the pallets.

An object of the invention is to provide a method making it possible to achieve optimal stowage of the objects on one or more pallets.

Another object of the invention is to provide a versatile method of handling objects of unknown shapes, sizes, and weights with a view to palletizing them, which method requires only a small infrastructure and a small footprint, while also enabling pallet-forming operations to take place in parallel.

To these ends, the invention provides a palletizing method for palletizing objects into batches on pallets, which method comprises a step of acquiring identification and morphology data identifying and indicating the morphologies of the objects to be palletized so as to optimize the stowage of the objects on a pallet, said method being characterized in that: trolleys carrying the objects to be palletized are moved by shuttle robots from a feed point at which objects are fed in and at which the objects are loaded onto the trolleys, one object per trolley, to a buffer storage zone, and then to palletizing stations, under the control of a monitoring and control unit; after the objects have been loaded onto the trolleys at the feed point, the step of acquiring the identification and morphology data identifying and indicating the morphologies of the objects is performed, and then the trolleys carrying the objects are deposited in the buffer storage zone by the shuttle robots; on the basis of the identification and morphology data identifying and indicating the morphologies of the objects, the monitoring and control unit determines when a complete batch of objects to be palletized can be formed on a pallet, and computes a loading plan for loading said objects on the pallet, the plan being indicative of a time sequence in which the objects should be stowed on the pallet in order to obtain optimal distribution in three-dimensional space of the objects on the pallet; and in response to determining and computing the loading plan, the monitoring and control unit initiates loading of the complete batch by controlling the shuttle robots in such a manner as to retrieve the trolleys carrying the objects forming the complete batch from the buffer storage zone in such a manner as to present the trolleys in sequence to a palletizing station in the order of the time sequence for the objects.

In this method, objects to be palletized that are of unknown shapes and that arrive at a feed point can be identified and characterized so as to determine their morphologies, and they are then stored temporarily in buffer storage until all of the objects in a batch have been characterized, so that an optimal loading plan can be computed for loading a pallet that takes account of the morphologies of all of the objects forming said batch.

In addition, batches of objects of varied shapes to be palletized can be formed, an incomplete batch does not block the flows in the system since the objects forming it are stored temporarily and pallets can be loaded in parallel from a single feed point, thereby allowing a high degree of operational versatility to be achieved.

The invention may advantageously also have the following features:
- nesting trolleys may be used for handling the objects;
- the trolleys may be stored in the buffer storage zone on either side of travel aisles along which the shuttle robots can travel and at the ends of which the palletizing stations are situated;
- the objects of the same batch may be stored on trolleys along the same travel aisle along which the shuttle robots can travel;
- two palletizing stations may be fed in parallel with objects to be palletized coming from said feed point.

BRIEF DESCRIPTION OF THE DRAWINGS

The present invention can be better understood and other advantages appear on reading the following detailed description of an embodiment given by way of non-limiting example and with reference to the accompanying drawings, in which:

FIG. 2A shows the steps of a method of the invention for handling objects to be palletized that can be implemented by the system shown in FIG. 1A;

FIG. 2B shows a loading plan calculated and used during the steps of FIG. 2A; and FIG. 2C shows the data interchange between elements of FIG. 1A.

DESCRIPTION OF AN EMBODIMENT

System

Figure 1A:
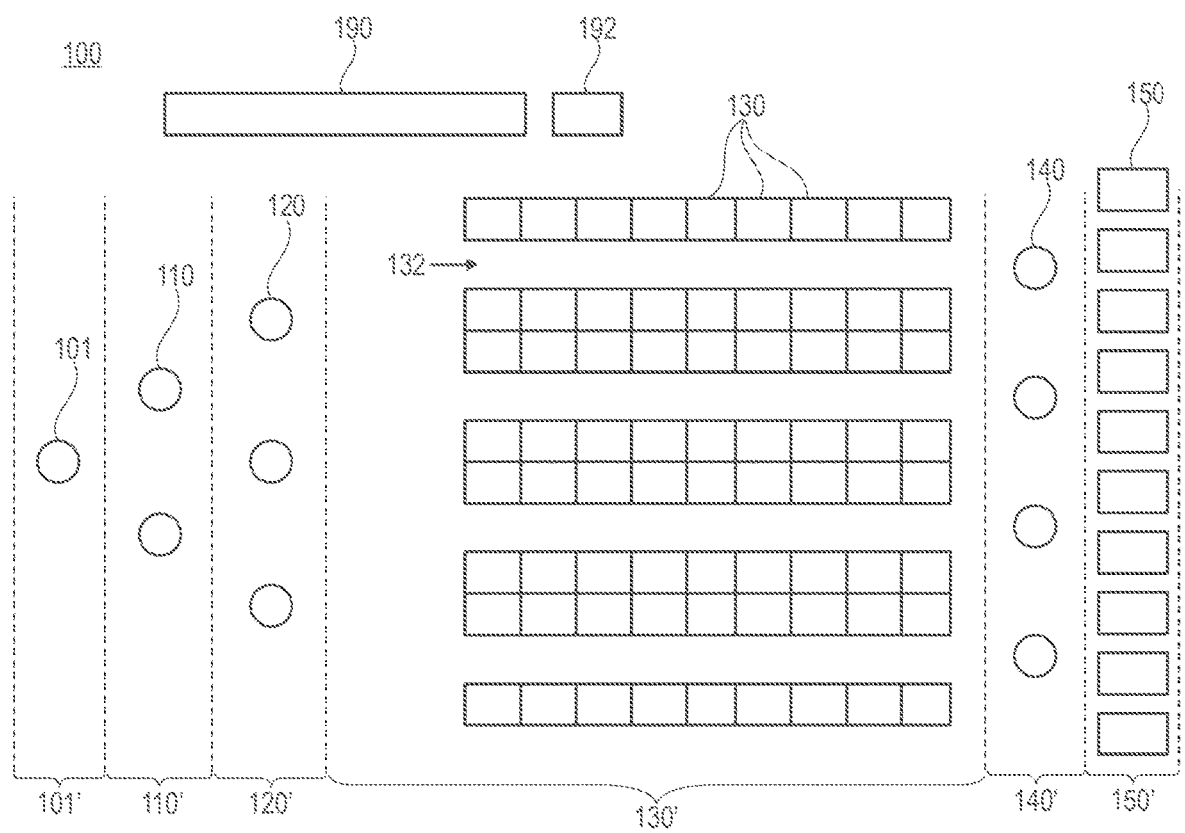
FIG. 1A shows an example of a system for handling and palletizing non-uniform objects that is capable of implementing the method of the invention.
Figure 1B:
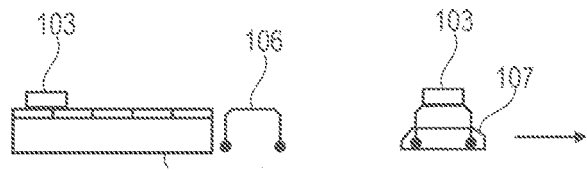
FIG. 1B shows an object arriving at a feed point of the system of FIG. 1A, and how the object is handled in the system.
Figure 1C:
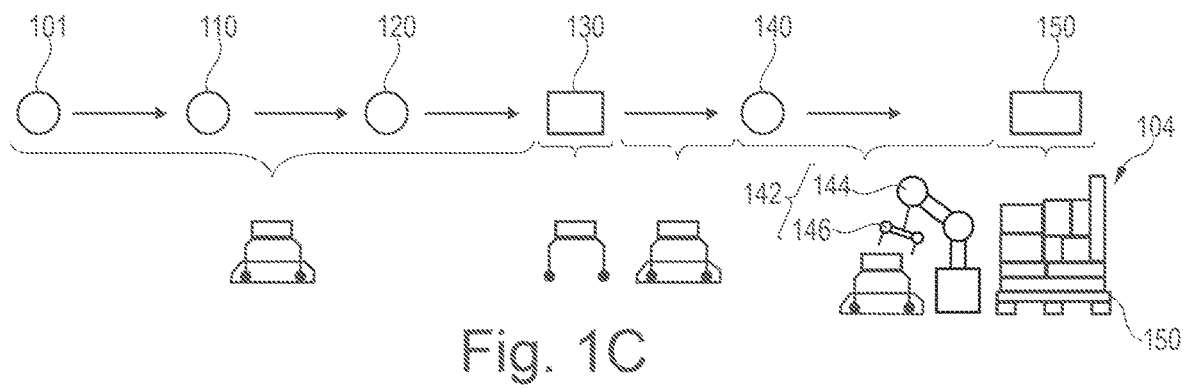
FIG. 1O shows the operations through which the object passes and the way in which it is handled from it entering the system to it being palletized.

A possible arrangement of a system for handling objects that is suitable for implementing a method of the invention for palletizing objects is shown by FIGS. 1A to 1C.

The system is based on the use of trolleys 106, such as nesting trolleys, for handling objects 103 automatically, along a processing path, the objects being loaded on trolleys 106 that are moved by shuttle robots 107 controlled remotely by a monitoring and control system 190.

For example, the shuttle robots may be electric vehicles, each of which is equipped with a battery and with a trolley-hitching system, and they may be controlled by the monitoring and control system via wireless communications.

The handling system includes at least one feed point 101 for feeding in the objects in a feed zone 101', identification devices 110 for identifying the objects in an identification zone 110', morphology-determining devices 120 for determining the morphologies of the objects in a morphology-determining zone 120', trolley reception points 130 for receiving trolleys in a buffer storage zone 130' for buffer storage of the objects, palletizing stations 140 for palletizing the objects in a palletizing zone 140', and pallets 150 that are empty or being loaded in a pallet waiting zone 150'.

The zones 101', 110', 120', 130', 140', and 150' may be placed in this order relative to one another, in such a manner as to procure smoother-flowing progress for an object to be palletized 103 that is on a trolley 106 and that, on arriving at a feed point 101, is presented to one of the identification devices 110 and to one of the morphology-determining devices 120, and is then stored at a trolley reception point 130 of the buffer storage zone 130' before being brought to one of the palletizing stations 140 and being stowed on one of the pallets 150.

The palletizing station is considered to be remote from the feed point, which means that a system for conveying the objects is necessary for moving the objects from the feed point to the palletizing station so they can travel a distance, or pass through an opening in a partition or a wall, or indeed cause the objects to pass via object-processing devices as described in detail below, before bringing said objects to the palletizing station.

In a particular embodiment, shown in FIG. 1B, the feed point 101 is an outlet of a conveyor 105 onto which, for example, parcels 103 arriving by truck have been placed by human operatives, so that the parcels arrive at the feed point sequentially, which parcels thus constitute the objects to be palletized.

Alternatively, the feed point 101 could, for example, be a truck-unloading bay and/or a depalletizing station.

The palletizing system may have more than one feed point 101, e.g. it may have N feed points 101, P identification devices 110 for identifying the objects, Q morphology-determining devices 120 for determining the morphologies of the objects, and R palletizing stations 140, where N, P, Q, and R are natural integers, and, for example, each door of a truck-unloading bay of a logistics building may constitute a distinct feed point 101.

By way of example, the identification devices 110 for identifying the objects may comprise optical reader systems optionally associated with computer-processing systems for processing images, such as optical character recognition (OCR) tools for recognizing characters and addresses, or Radiofrequency Identification (RFID) tag reader systems.

By way of example, the morphology-determining devices 120 for determining the morphologies of the objects may comprise optical measurement systems using known methods that may comprise image acquisition by illumination with white light or with laser beams, detection by one-dimensional or two-dimensional optical sensors, and/or analysis of one or more images for each object by computation.

The morphology-determining devices 120 may further comprise weight systems for weighing the objects.

The identification devices 110 and the morphology-determining devices 120 may be considered to be two sub-devices of the same device.

The trolley reception points 130 of the buffer storage zone 130' may merely be locations on the floor that are optionally marked out and/or equipped with accessories for holding or for effecting other operations on the trolleys and/or the shuttle robots.

Each of the palletizing stations 140 may include a manual loading system for loading by a human operative, which system transmits instructions from the monitoring and control system to the operative, but the palletizing station preferably includes an automated loading system 142 controlled by the monitoring and control system and that may, for example, comprise a robot arm 144 and its gripper 146, as shown in FIG. 1C.

The monitoring and control system 190 comprises an information-processing device such as a processor, an information storage device, such as a computer memory, and wired or wireless means of communication with the other elements of the system, i.e. the identification devices 110, the morphology-determining devices 120, the palletizing stations 140, and the shuttle robots 107, and the monitoring and control system further comprises a database 192 for storing information relating to the objects to be palletized, such as their identities and associated sorting attributes, their morphologies and/or their weights, together with their degrees of progress through the system and the trolleys on which they are loaded; the functional links making both-way data interchange possible between the monitoring and control system 190 and the elements of the system that are mentioned above are shown in FIG. 2C.

In particular, the monitoring and control system 190 is configured to control the shuttle robots and to feed and refresh the database 192 with the data acquired by the identification devices and by the morphology-determining devices.

For any one input point, the number of identification devices, the number of morphology-determining devices and/or the number of palletizing stations may be adjusted as a function of their respective processing capacities and of the expected object throughput rate of the palletizing system.

Operations

The method 200 of the invention for palletizing objects in batches comprises a step of identifying and of determining the morphologies of the objects prior to a step of palletizing them.

During a step 203, objects that are part of a stream of objects 103 to be palletized, and arriving sequentially at the feed point 101 of the system for implementing the palletizing method, are loaded onto the trolleys 106 present at the feed point 101, one object per trolley.

The objects may be part of the same batch of objects to be palletized, or else be part of different batches and thus be palletized on different pallets.

The trolleys are brought by the shuttle robots 107, on instruction from the monitoring and control unit, to the feed point, where the trolleys are loaded manually by a human operative or by means of an automated device, e.g. by a robot arm provided with a gripper.

During a step 206, the objects 103 loaded on the trolleys 106 are moved by the shuttle robots 107, and each of them is presented to one of the identification devices 110 for identifying the objects that recognizes attributes of the object, such as identification data that can be used by the monitoring and control unit for assigning the objects to a batch of objects to be palletized, optionally in combination with sorting data that is stored in advance in the database 192.

In this way, respective batches to which the objects are to belong can be determined, e.g. according to their destinations and/or to the uses that are subsequently to be made of them.

The identification devices may, in particular, be capable of optically recognizing identification marks borne by the objects, such as bar codes, numbers, originating and/or destination addresses, content codes, or any other visual information that is of use for identifying and/or sorting the objects, and that can be read by means of a laser scanner, of a camera, or of any other known optical device incorporated into each of the identification devices.

The identification data for identifying the objects may also be stored, for example, in a computer memory of an RFID chip, and read by the identification devices using known methods.

The identification data can enable the monitoring and control unit to make respective data that is pre-recorded in the database correspond to each of the objects that are brought past the identification device.

The identification data for identifying the objects or the data pre-recorded in the database may indicate one or more characteristics of the corresponding one of the objects, such as its weight, its destination or storage address, a batch number indicating the batch into which the object is to be put, a type or any other category defined, for example, by a supplier, a recipient, a manufacturer, or a transporter.

During a step 209, each of the objects on trolleys that have gone past identification devices is moved and then presented to one of the morphology-determining devices for determining the morphologies of the objects in order to determine its morphology, i.e. its outside shape, and its physical dimensions, and optionally its weight or its stiffness.

During step 209, the morphologies, the dimensions, and optionally the weights of the objects may be stored and associated with the corresponding objects in the database 192.

Steps 206 and 209 collectively form an acquisition step for acquiring the identification data and the morphology data relating to the objects.

In particular, following the identification and morphology-determining step, the monitoring and control unit identifies or forms respective batches to which the identified objects are to belong.

The batches to which the objects are to belong may be defined in advance, e.g. on the basis of knowing the respective identities of the parcels and their respective addresses.

Alternatively, the batches to which the objects are to belong may be formed as the objects arrive, on the basis of rules defined in advance and, for example, based on the dimensions and the capacities of the pallets, on the destination addresses, and on the dimensions and/or weights of the objects.

During a step 212, the objects on trolleys that have been identified and that have had their morphologies determined after being presented to the identification and morphology-determining devices are placed at trolley reception points of the buffer storage zone, and then the shuttle robots unhitch themselves from their respective trolleys to wait for a new task, e.g. taking charge of empty trolleys to be taken to the feed point.

The objects on trolleys may be disposed in the buffer storage zone without being located in any particular way, or, alternatively, each of the objects on trolleys may be brought to a location of the buffer zone that is a function of the identification data for identifying the objects, e.g. in such a manner as to gather together the objects of the same batch in the same portion of the buffer storage zone.

In particular, the monitoring and control unit may control the shuttle robots in such a manner as to place the trolleys at trolley reception points 130 of the storage zone on either side of travel aisles 132 along which the shuttle robots can travel and at the ends of which the palletizing stations 140 are situated.

Nesting trolleys may be used as the trolleys, such trolleys being suitable for enabling one or more of them to nest together while each of them is also loaded with an object, in such a manner as to minimize the footprint occupied by them in the buffer storage zone.

During a test step T212, the monitoring and control unit acts, on the basis of the identification and morphology data relating to the objects, to determine whether all of the objects forming a complete batch of objects to be stowed on a pallet have been presented to the identification and morphology-determining devices.

It should be noted that the test step T212 may be performed before the objects are transferred to the buffer storage zone.

In a particular embodiment of the method, this determination may be effected by checking whether all of the objects forming a batch of objects to be palletized on the same pallet are gathered together in the buffer storage zone, e.g. by refreshing a list of objects present in the buffer storage zone, and by comparing said list with lists of objects forming the batches to be palletized.

More generally, when the monitoring and control unit determines that all of the objects forming a batch have been presented to the identification and morphology-determining devices, and thus that the shapes, dimensions, and/or weights of all of the objects forming the given batch have been characterized, the monitoring and control unit computes, during a step 215, an optimal loading plan 250 for the complete batch as a function of the morphology information about each of the objects forming said complete batch, and optionally as a function of their weights.

Since the loading plan is established by taking account of the characteristics of all of the objects forming a batch before beginning loading, the palletizing can be optimized before the start of stowage, and thus not require any rearrangement to correct any defect due to lack of knowledge about the objects to be stowed.

The loading plan 250 is a dataset stored in the database 192 and managed by the monitoring and control system 190, it being possible for the dataset to be represented by the table of FIG. 2B, in which table each object of a complete batch of n objects is identified by an identifier $Id_i$, where i varies in the range 1 to n, and indicates one of the n objects.

The stowage plan indicates, in particular, a time sequence T indicating the order of loading $T_i$ of each object $Id_i$ on the pallet in order to obtain optimal distribution in three-dimensional space of the objects of the complete batch on the pallet.

The stowage plan may also indicate position data ($x_i$, $y_i$, $z_i$) and angle data ($a_i$, $b_i$, $c_i$) indicating the position and the angle of each of the objects on the pallet, it being possible for such data to be used for stowing the objects at the palletizing station.

Regardless of the result of the test step T212, steps 203 206, 209, and 212 can continue to be performed without any interruption so long as the objects are arriving at the feed point(s), e.g. so as to process, in parallel, objects forming other batches to be palletized.

During a step 218, coming after the loading plan 250 is computed in step 215, the trolleys carrying the objects forming a complete batch are moved by the shuttle robots so as to bring them from the buffer storage zone 130' to a palletizing station 140, where the objects are palletized in compliance with a corresponding loading plan during a step 221.

For this purpose, the monitoring and control unit initiates the operations of loading the pallet of the complete batch by controlling the available shuttle robots so that they hitch up to the trolleys in the buffer storage zone that are loaded with objects belonging to the complete batch, and so that they bring those trolleys to a palletizing station in the order indicated by the loading plan.

In a particular embodiment of the method, the objects of the same batch are brought and stored along the same travel aisle of the buffer storage zone, and they are then palletized by a palletizing station situated at the end of said travel aisle, this offering the advantage of minimizing the paths to be traveled by the objects from their respective locations in the buffer storage zone to the palletizing station where they are to be palletized, and thus the advantage of accelerating the loading operations and/or of improving the rate of actual use of the shuttle robots.

The automated loading system of the palletizing station may be controlled by the monitoring and control system 190 so as to stow the objects 103 in compliance with the loading plan established individually for each batch of objects 104 to be stowed on a pallet 150.

Thus, a plurality of palletizing stations may be fed in parallel in such a manner as to load a plurality of pallets simultaneously with objects to be palletized coming from the same feed point.

It should be noted that by proceeding as described above, arbitrary numbers of pallets can be loaded in parallel without any fixed infrastructure dimensioned for a maximum capacity of the device, thereby leading to savings in investment in the infrastructure, and to increased flexibility in the loading operations.

In addition, the objects are stowed in batches on each pallet in compliance with stowage plans that take into account the morphologies of all of the objects forming the batches, and that are established prior to beginning the operations for palletizing each batch, thereby making it possible for extremely effective optimization of the stowage to be achieved, in particular for batches of objects that are not uniform, i.e. batches formed of objects that are morphologically different from one another.

The invention claimed is:

1. A palletizing method for palletizing objects into batches on pallets, comprising the steps of:
   acquiring identification and morphology data identifying and indicating the morphologies of the objects to be palletized so as to optimize the stowage of the objects on a pallet, wherein
   trolleys carrying the objects to be palletized are moved by shuttle robots from a feed point at which objects are fed in and at which the objects are loaded onto the trolleys, one object per trolley, to a buffer storage zone, and then to palletizing stations, under the control of a monitoring and control unit;
   after the objects have been loaded onto the trolleys at the feed point, the step of acquiring the identification and morphology data identifying and indicating the morphologies of the objects is performed by means of identification devices and morphology-determining devices of the objects, and then the trolleys carrying the objects are deposited in the buffer storage zone by the shuttle robots;
   on the basis of the identification and morphology data identifying and indicating the morphologies of the objects, the monitoring and control unit determines when a complete batch of objects to be palletized can be formed on a pallet, and when the monitoring and control unit determines that all the objects forming the complete batch have been presented to the identification and morphology-determining devices, the monitoring and control unit computes a loading plan for loading said objects on the pallet, the plan being indicative of a time sequence in which the objects should be stowed on the pallet in order to obtain an optimal distribution in three-dimensional space of the objects on the pallet as a function of the morphologies about each of the objects forming said complete batch; and
   in response to determining and computing the loading plan, the monitoring and control unit initiates loading of the complete batch by controlling the shuttle robots in such a manner as to retrieve the trolleys carrying the objects forming the complete batch from the buffer storage zone in such a manner as to present the trolleys in sequence to a palletizing station in the order of the time sequence for the objects.

2. The palletizing method according to claim 1, wherein nesting trolleys are used for handling the objects.

3. The palletizing method according to claim 2, wherein the trolleys are stored in the buffer storage zone on either side of travel aisles along which the shuttle robots can travel and at the ends of which the palletizing stations are situated.

4. The palletizing method according to claim 3, wherein the objects of the same batch are stored on trolleys one object per trolley along the same travel aisle along which the shuttle robots can travel.

5. The palletizing method according to claim 1, wherein two palletizing stations are fed in parallel with objects to be palletized coming from said feed point.

6. The palletizing method according to claim 1, wherein the trolleys are stored in the buffer storage zone on either side of travel aisles along which the shuttle robots can travel and at the ends of which the palletizing stations are situated.

7. The palletizing method according to claim 6, wherein the objects of the same batch are stored on trolleys along the same travel aisle along which the shuttle robots can travel.

* * * * *